US012752582B2

(12) United States Patent
Deng et al.

(10) Patent No.: US 12,752,582 B2
(45) Date of Patent: Oct. 6, 2026

(54) LOW-RESISTANCE AMPHIBIOUS VEHICLE

(71) Applicants: Zhuhai College of Science and Technology, Zhuhai (CN); Shenzhen Hesby Marine Technology Co., LTD, Shenzhen (CN)

(72) Inventors: Baoqing Deng, Zhuhai (CN); Mengqi Deng, Zhuhai (CN); Zhuo Yang, Zhuhai (CN); Jun Shi, Shenzhen (CN); Yuxiang Shi, Shenzhen (CN); Weijie Wu, Zhuhai (CN)

(73) Assignees: Zhuhai College of Science and Technology, Zhuhai (CN); Shenzhen Hesby Marine Technology Co., LTD, Shenzhen (CN)

( * ) Notice: Subject to any disclaimer, the term of this patent is extended or adjusted under 35 U.S.C. 154(b) by 145 days.

(21) Appl. No.: 19/007,432

(22) Filed: Dec. 31, 2024

(65) Prior Publication Data

US 2026/0070383 A1 Mar. 12, 2026

(30) Foreign Application Priority Data

Sep. 11, 2024 (CN) ........................ 202411270800.5

(51) Int. Cl.
*B60F 3/00* (2006.01)
*B62D 25/16* (2006.01)
*B63H 23/26* (2006.01)
*B63H 23/30* (2006.01)

(52) U.S. Cl.
CPC ............ *B60F 3/003* (2013.01); *B60F 3/0007* (2013.01); *B62D 25/16* (2013.01); *B63H 23/26* (2013.01); *B63H 23/30* (2013.01)

(58) Field of Classification Search
CPC . B60F 3/00; B60F 3/007; B60F 3/003; B62D 25/16; B63H 23/30; B63H 23/26
See application file for complete search history.

(56) References Cited

U.S. PATENT DOCUMENTS 3,495,672 A * 2/1970 Barr ...................... B60B 15/263 301/38.1
4,958,584 A * 9/1990 Williamson ............ B60F 3/003 440/12.52
5,769,021 A * 6/1998 Schad ..................... B60F 3/003 440/37

* cited by examiner

*Primary Examiner* — Stephen P Avila

(57) ABSTRACT

The present disclosure discloses a low-resistance amphibious vehicle, and relates to the field of multifunctional vehicles. The low-resistance amphibious vehicle comprises a vehicle body, wherein a streamlined front bumper and a streamlined rear bumper are provided on the front side and the rear side of the vehicle body respectively, and a retractable suspension mechanism is provided at the bottom of the vehicle body, a wheel well shielding and resistance reduction mechanism is provided on both sides of the vehicle body.

10 Claims, 8 Drawing Sheets

LOW-RESISTANCE AMPHIBIOUS VEHICLE

CROSS-REFERENCE TO RELATED APPLICATION

This application claims priority of Chinese Patent Application No. 202411270800.5, filed on Sep. 11, 2024, the entire contents of which are incorporated herein by reference.

TECHNICAL FIELD

The present disclosure relates to the technical field of multifunctional vehicles, in particular to a low-resistance amphibious vehicle.

BACKGROUND

Amphibious vehicles have received widespread attention. Amphibious vehicles can adjust the movement modes according to the changes in the water and land driving environment, and are capable of moving on land and water; in addition, the vehicles are capable of entering water from land and entering land from water at the junction of land and water. Most of the existing amphibious vehicles are in the displacement stage of low-speed navigation, which is difficult to meet many modern high-speed driving operation requirements.

There are three approaches to improve the speed on water, that is, improving the propulsion efficiency, increasing engine power and reducing resistance in water. Improving propulsion efficiency and increasing engine power start from the driving force; the former requires the improvement of the travel output parts, and the latter requires higher energy consumption. Reducing resistance in water is a research direction to reduce negative impacts and thus increase the travel speed, which is easier to achieve. The existing research program is mainly to adjust the shape of the vehicle body and shell, and design a shell that is more in line with the fluid dynamics, so that more resistance can be reduced when amphibious vehicles are driving on water. However, in actual application, the excessively exaggerated and subversive design makes amphibious vehicles have many inconveniences when driving on land. Meanwhile, many shells designed in accordance with fluid mechanics are very prone to collision and damage when driving on land. Therefore, a low-resistance amphibious vehicle is specially provided.

SUMMARY

In view of the deficiencies in the prior art, the present disclosure provides a low-resistance amphibious vehicle, which solves the problem of reducing the drag of the existing amphibious vehicles in water. By designing a shell that is more in line with fluid dynamics, an amphibious vehicle can reduce more drag when driving in water. However, in actual application, the excessively exaggerated and subversive design makes amphibious vehicles have many inconveniences when driving on land.

In order to achieve the above object, the present disclosure is implemented by the following technical solutions: a low-resistance amphibious vehicle comprises a vehicle body, wherein a streamlined front bumper and a streamlined rear bumper are provided on the front side and the rear side of the vehicle body respectively, a wheel is mounted at the bottom of the vehicle body, and a retractable suspension mechanism is provided at the bottom of both the front and rear ends of the vehicle body;

the retractable suspension mechanism comprises an assembly bracket plate, a quadrilateral cantilever member and a telescopic hydraulic spring, the assembly bracket plate is fixedly arranged on the side of the vehicle body, and the quadrilateral cantilever member is movably hinged between the wheel and the assembly bracket plate, the telescopic hydraulic spring is fixedly mounted inside the vehicle body, and the bottom end of the telescopic hydraulic spring is movably hinged with the quadrilateral cantilever member;

a wheel well shielding and resistance reduction mechanism is provided on both sides of the vehicle body, and the wheel well shielding and resistance reduction mechanism comprises a cover plate moving part fixedly arranged on the outer wall of the vehicle body and a wheel well cover plate mounted on the cover plate moving part.

The cover plate moving part may be a manual movable bracket or a pneumatic telescopic rod structure;

When the cover plate moving part is a manual movable bracket, the manual movable bracket includes a slide rail, a flip bracket, a sliding connecting piece and an assembly strip, the slide rail is fixedly mounted on the side of the shell, the sliding connecting piece is slidably connected to the inside of the slide rail, the flip bracket is fixedly mounted on the outer surface of the sliding connecting piece, the assembly strip is fixedly mounted on the side of the flip bracket, and the wheel well cover plate is fixedly mounted on the assembly strip.

Preferably, a sliding rod is fixedly mounted inside the sliding connecting piece, and balls are provided at both ends of the sliding rod, and the balls are rollingly connected inside the slide rail.

Preferably, the flip bracket comprises a V-shaped flip connecting arm, a mounting bar, an assembly portion, and a fixed bolt. The mounting bar is fixedly mounted on the outer surface of the sliding connecting piece, one end of the V-shaped flip connecting arm is rotatably connected to the mounting bar, the middle part of the V-shaped flip connection arm is rotatably connected to the assembly strip, the assembly portion is fixedly mounted inside the other end of the V-shaped flip connecting arm, the fixed bolt is movably plugged into the inside of the V-shaped flip connection arm, the fixed bolt penetrates through the sliding connecting piece, and the fixed bolt is movably plugged into the slide rail.

Preferably, a hook is fixedly mounted on the inner side of the assembly portion, a traction spring is mounted between two groups of the hooks, and a connecting column is fixedly mounted between two groups of the assembly strips.

Preferably, the wheel well cover plate comprises a streamlined cover plate, an outer curved raised handle portion, an assembly connecting rod and an inner concave wheel groove, the outer curved raised handle portion is integrally formed on the outside of the streamlined cover plate, the inner concave wheel groove is formed on the inner side of the outer curved raised handle portion, the assembly connecting rod is fixedly welded to the outer surface of the streamlined cover plate, and the assembly connecting rod is fixedly mounted on the assembly strip by means of bolts.

When the cover plate moving part is a pneumatic telescopic rod structure, the pneumatic telescopic rod adopts a double-acting cylinder structure, and compressed air is provided by a vehicle-mounted air compressor to achieve telescopic movement, a cylinder body of the pneumatic telescopic rod is hinged to the vehicle body, and a piston rod is hinged to the wheel well cover plate, and the opening and closing angle and speed of the wheel well cover plate are precisely controlled by controlling the pressure difference on both sides of the inner cavity of the pneumatic telescopic rod, to achieve smooth switching of the wheel well cover plate between the driving state and the water navigation state, and improve the amphibious performance and reliability of the vehicle. The output end of the pneumatic telescopic rod is fixedly mounted with the wheel well cover plate, thereby pulling the wheel well cover plate to automatically open and close and slide.

Preferably, the vehicle body comprises a shell, a frame and a power assembly, the power assembly is fixedly mounted inside the frame, the shell is mounted on the outer surface of the frame in a covered manner, and the streamlined front bumper and the streamlined rear bumper are fixedly assembled on the front end and the rear end of the shell respectively.

Preferably, the assembly bracket plate is fixedly mounted on the frame, the inner side of the wheel is rotatably connected to a wheel hub assembly, the wheel hub assembly is fixedly mounted on the side of the frame, and the power assembly is drivingly connected to the wheel.

Preferably, the quadrilateral cantilever member comprises an upper cantilever, a lower cantilever, and a suspension arm, the ends of the upper cantilever and the lower cantilever are both rotatably connected to the outer side wall of the assembly bracket plate, one end of the suspension arm is movably hinged to the upper cantilever, the other end of the upper cantilever is fixedly mounted to the wheel hub assembly, and the end of the lower cantilever is movably hinged to the bottom end of the suspension arm.

Preferably, the bottom end of the telescopic hydraulic spring is fixedly mounted on the suspension arm, the wheel hub assembly is internally rotatably connected to a wheel axle, and a ball cage transmission shaft is mounted between the power assembly and the wheel.

Preferably, the wheel well cover plate is made of a lightweight and high-strength carbon fiber composite material, the surface is streamlined and smoothed, and smoothly transitions with the outer wall of the vehicle body, which can effectively reduce water flow resistance and improve navigation speed and efficiency when sailing on water. Meanwhile, a flexible sealing strip is provided between the wheel well cover plate and the vehicle body, which can prevent water from entering the wheel well when the wheel well cover plate is in a closed state, thereby ensuring the water tightness of the vehicle.

Preferably, the pneumatic telescopic rod adopts a double-acting cylinder structure, and compressed air is provided by a vehicle-mounted air compressor to achieve telescopic movement. A cylinder body of the pneumatic telescopic rod is hinged to the vehicle body, and a piston rod is hinged to the wheel well cover plate. The opening and closing angle and speed of the wheel well cover plate can be accurately controlled by controlling the pressure difference on both sides of the inner cavity of the pneumatic telescopic rod, to achieve smooth switching of the wheel well cover plate between the driving state and the water navigation state and improve the amphibious performance and reliability of the vehicle.

Preferably, a pair of propellers that rotate relative to each other are provided at the bottom of the vehicle body. The propellers are foldable in design and can be folded into a groove at the bottom of the vehicle body to be flush with the outer wall of the bottom of the vehicle body when driving on land, without affecting the normal driving of the vehicle. When sailing on water, the propellers are unfolded and rotated at a high speed to generate a strong propulsion force to push the vehicle to sail at a high speed on the water. The folding and unfolding of the propellers are controlled by an electric mechanism and can be freely switched as needed.

Preferably, the power switching mechanism comprises a power input shaft, two power output shafts and a multi-disc hydraulic clutch, the power input shaft is connected to the output shaft of the power assembly, the two power output shafts are drivingly connected to the wheel and the propeller respectively, the multi-disc hydraulic clutch is mounted between the power input shaft and the two power output shafts. By controlling the engagement state of the multi-disc hydraulic clutch, free switching of power between the wheel and the propeller is achieved, and the high efficiency and reliability of power transmission is ensured.

Preferably, the multi-disc hydraulic clutch comprises a driven disc mounted on the power input shaft, two groups of driving discs mounted on the two power output shafts and a hydraulic actuating mechanism for pushing the driving disc and the driven disc. The hydraulic actuating mechanism provides hydraulic oil through a vehicle-mounted hydraulic pump, and controls the pressure and flow of the hydraulic oil to accurately control the engagement torque of the driving disc and the driven disc, achieve smooth switching of power between the wheel and the propeller, avoid the impact and wear during the power switching process, and improve the working efficiency and service life of the power switching mechanism. Meanwhile, the multi-disc hydraulic clutch adopts a structure in which multiple pairs of driving discs and driven discs are alternately arranged, which greatly increases the friction contact area, improves the ability to transmit torque, and meets the power requirements of the vehicle under complex working conditions.

The present disclosure discloses a low-resistance amphibious vehicle, which has the following beneficial effects:

1. A wheel well shielding and resistance reduction mechanism is designed at the wheel of the low-resistance amphibious vehicle. When the wheel is retracted to the inner bottom of the shell after entering water, the fixed bolt is pulled outwardly such that the end of the fixed bolt is moved out from the inner wall of the upper slide rail. At this time, the wheel well cover plate and the flip bracket are slid along the slide rail so that the wheel well cover plate slides close to the outer wall of the wheel. The wheel well cover plate is pulled outwardly and then pushed downward so that the V-shaped flip connecting arm rotates on the outer surface of the mounting bar, thereby lowering the wheel well cover plate. At the same time, the wheel well cover plate is closer to the wheel, and the wheel is wrapped by the inner concave wheel groove. Then, the fixed bolt is pushed inwardly to be plugged into the lower slide rail, so that the wheel does not directly contact the water flow, thereby reducing the friction resistance of the vehicle body. In addition, when driving on the road, the wheel well cover plate fits the outer surface of the shell and does not affect driving on land.
2. A retractable suspension mechanism is designed for the connecting part between the vehicle body and the wheel of the low-resistance amphibious vehicle. When driving on the road, a hydraulic rod inside the telescopic hydraulic spring is extended, such that the telescopic hydraulic spring becomes longer as a whole. At this time, the internal spring is used for driving shock absorption. Meanwhile, as the internal hydraulic rod is extended, the suspension arm is driven to move downward. At this time, the suspension arm, the upper cantilever, the lower cantilever and the assembly bracket plate constitute a parallelogram structure, so that the suspension arm will not twist when descending, and move downward and outward as a whole to cope with the bumps when driving on the road. When the amphibious vehicle enters water, the hydraulic rod inside the telescopic hydraulic spring is contracted, so that the suspension arm moves upward and inward to drive the wheel to retract to the bottom of the vehicle shell, thereby reducing the contact between the wheel components and the water body and reducing the sailing resistance.

3. The low-resistance amphibious vehicle is designed with a streamlined front bumper at the front end of the shell and a streamlined rear bumper at the rear end of the shell by simply modifying the shape of the vehicle body. Meanwhile, the entire bottom of the shell is flat, with a pointed front end and a square rear end. The shell part at the wheel hub position adopts a wheel eyebrow streamlined design, which can effectively reduce the viscous resistance of the amphibious vehicle in the underwater part. Furthermore, such a design can reduce the resistance of the amphibious vehicle when gliding in the water, thereby improving the water navigation efficiency.

BRIEF DESCRIPTION OF THE DRAWINGS

In order to illustrate the embodiments of the present disclosure or the technical solutions in the prior art more clearly, the accompanying drawings used in the embodiments or in the prior art will be briefly described below. Apparently, the accompanying drawings in the following description are only a part of embodiments of the present disclosure, and for persons of ordinary skill in the art, other drawings can be obtained based on these accompanying drawings without creative efforts.

Figure 1:
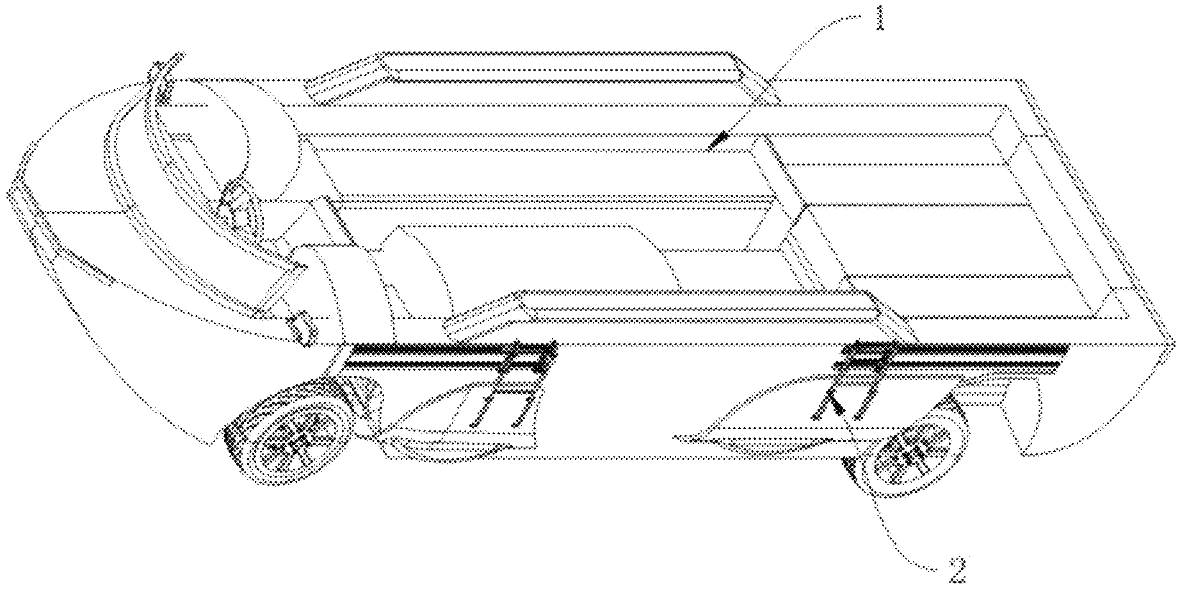
FIG. 1 is a structural schematic diagram of a wheel well shielding and resistance reduction mechanism of the overall outer surface of the present disclosure in the folded state.

Reference numerals: 11, shell; 12, streamlined front bumper; 13, streamlined rear bumper; 14, frame; 15, power assembly; 16, wheel; 17, retractable suspension mechanism; 171, assembly bracket plate; 172, quadrilateral cantilever member; 1721, upper cantilever; 1722, lower cantilever; 1723, suspension arm; 1724, ball cage transmission shaft; 173, telescopic hydraulic spring; 174, wheel hub assembly; 175, wheel axle; 2, wheel well shielding and resistance reduction mechanism; 21, wheel well cover plate; 211, streamlined cover plate; 212, outer curved raised handle; 213, assembly connecting rod; 214, inner concave wheel groove; 22, cover plate moving part; 221, slide rail; 222, flip bracket; 2221, V-shaped flip connecting arm; 2222, mounting bar; 2223, assembly portion; 2224, hook; 2225, fixed bolt; 223, sliding connecting piece; 224, assembly strip; 225, connecting column; 226, sliding rod; 227, balls; 228, traction spring.

DETAILED DESCRIPTION

In order to illustrate the object, technical solutions and advantages of the embodiments of the present disclosure more clearly, the technical solutions of the embodiments of the present disclosure will be described clearly and completely. Apparently, embodiments described are only a part of embodiments of the present disclosure, and are not all of embodiments thereof. All other embodiments obtained by persons of ordinary skill in the art based on the embodiments of the present disclosure without creative efforts shall fall within the protection scope of the present disclosure.

The embodiments of the present application provide a low-resistance amphibious vehicle, which solves the problem of reducing the drag of the existing amphibious vehicles in water. By designing a shell that is more in line with fluid dynamics, an amphibious vehicle can reduce more drag when driving in water. However, in actual application, the excessively exaggerated and subversive design makes amphibious vehicles have many inconveniences when driving on land.

In order to better understand the foregoing technical solutions, the present disclosure will be described in detail below in conjunction with the accompanying drawings and specific embodiments.

The examples of the present disclosure disclose a low-resistance amphibious vehicle.

Figure 2:
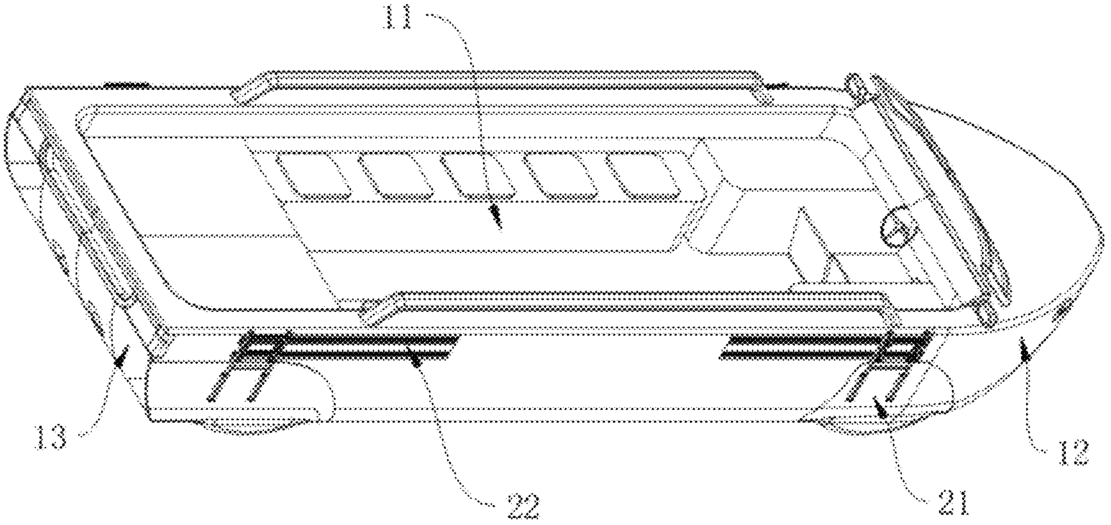
FIG. 2 is a structural schematic diagram of a wheel well shielding and resistance reduction mechanism of the overall outer surface of the present disclosure in the use state.
Figure 3:
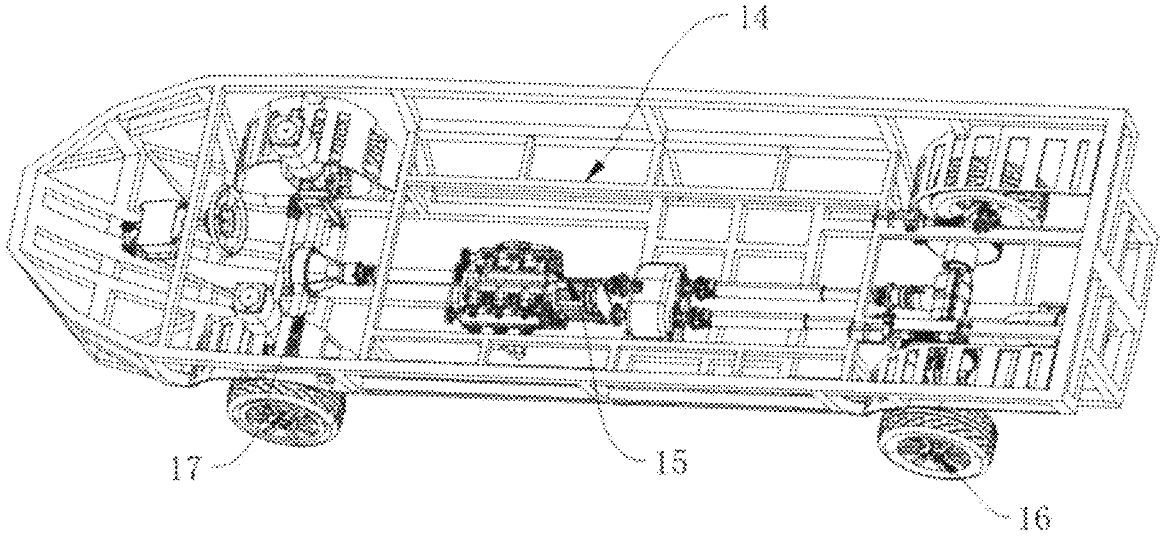
FIG. 3 is a schematic diagram of an internal structure of a frame of the present disclosure.
Figure 4:
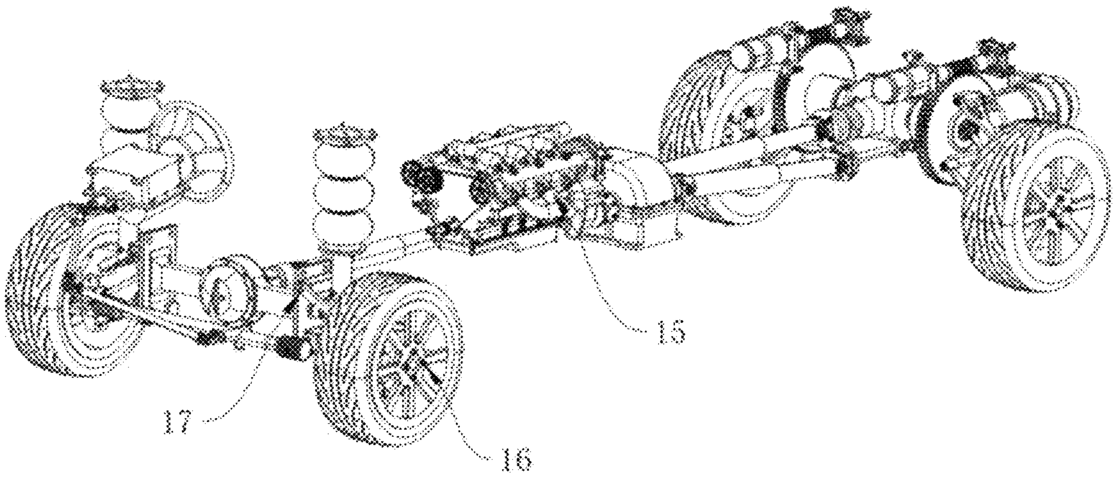
FIG. 4 is a schematic diagram of an outer surface structure of a power assembly of the present disclosure.
Figure 5:
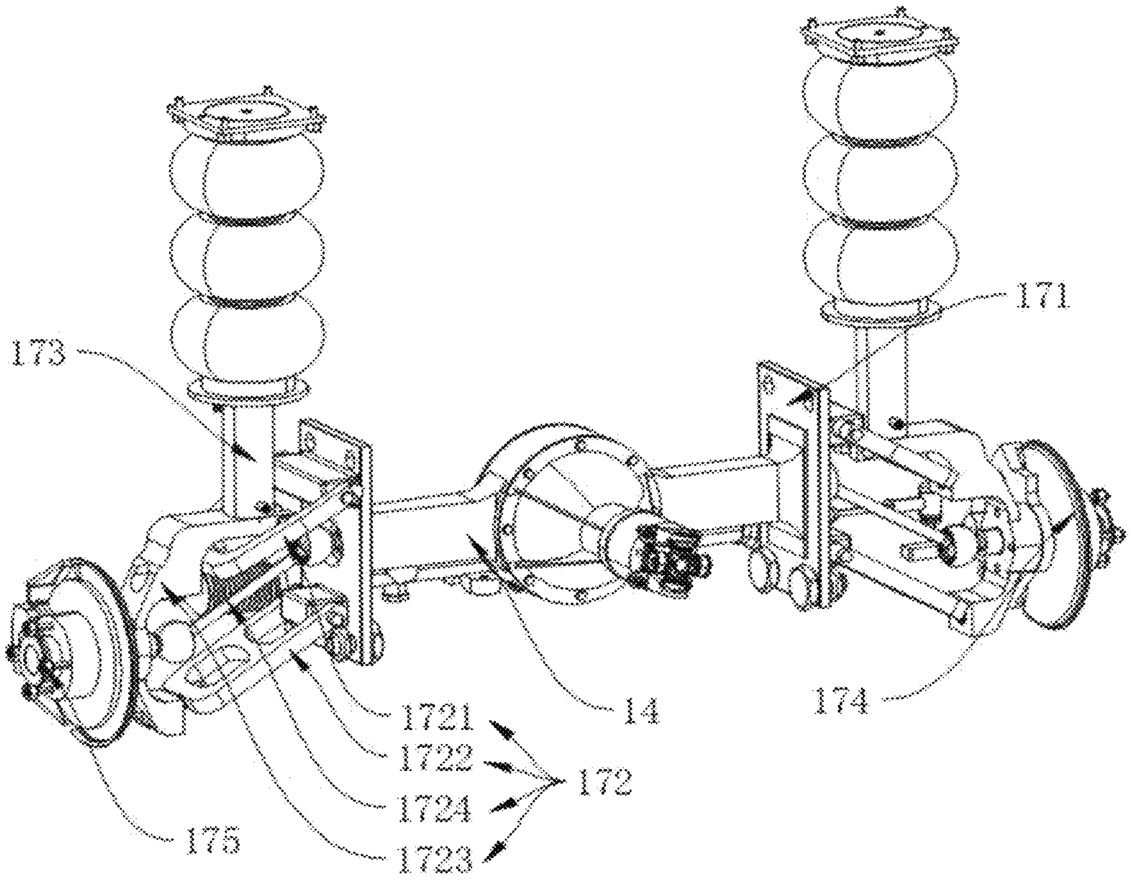
FIG. 5 is a structural schematic diagram of a retractable suspension mechanism of the present disclosure.
Figure 6:
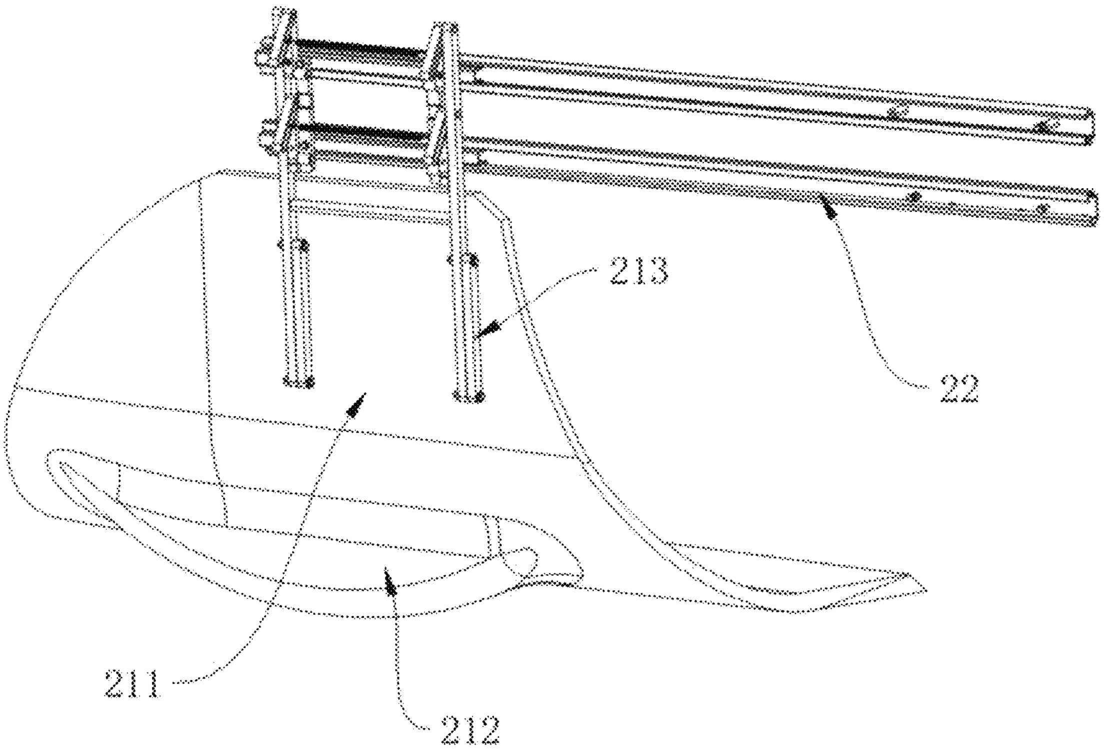
FIG. 6 is a schematic diagram of an outer surface structure of a wheel well shielding and resistance reduction mechanism of the present disclosure.
Figure 7:
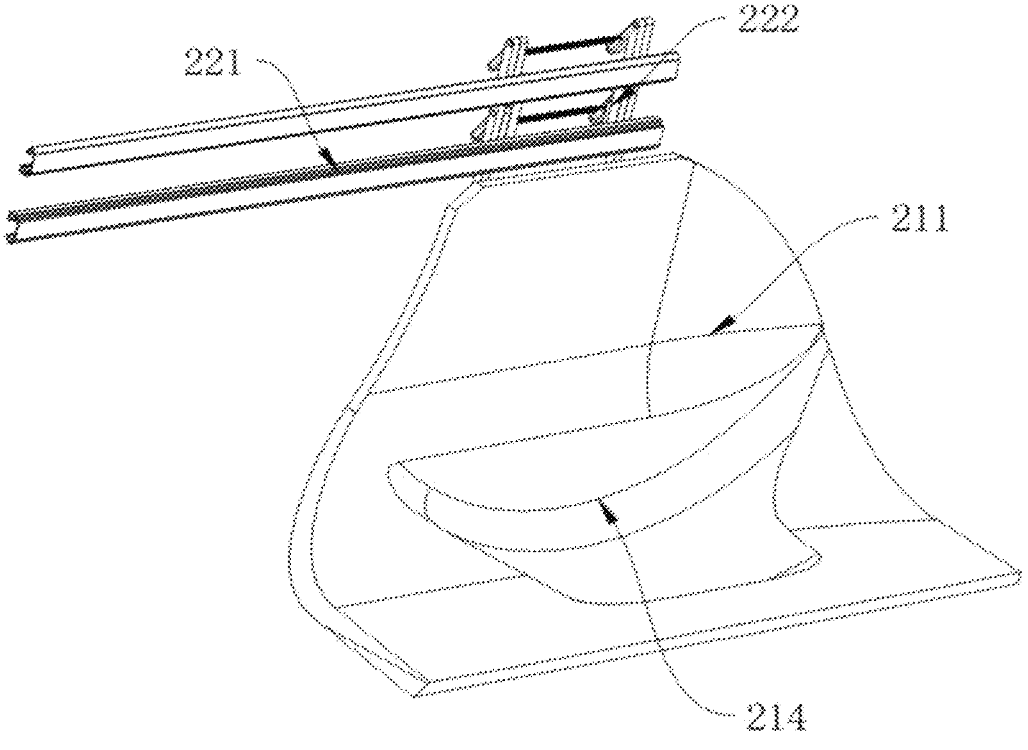
FIG. 7 is a schematic diagram of an inner side structure of a wheel well shielding and resistance reduction mechanism of the present disclosure.
Figure 8:
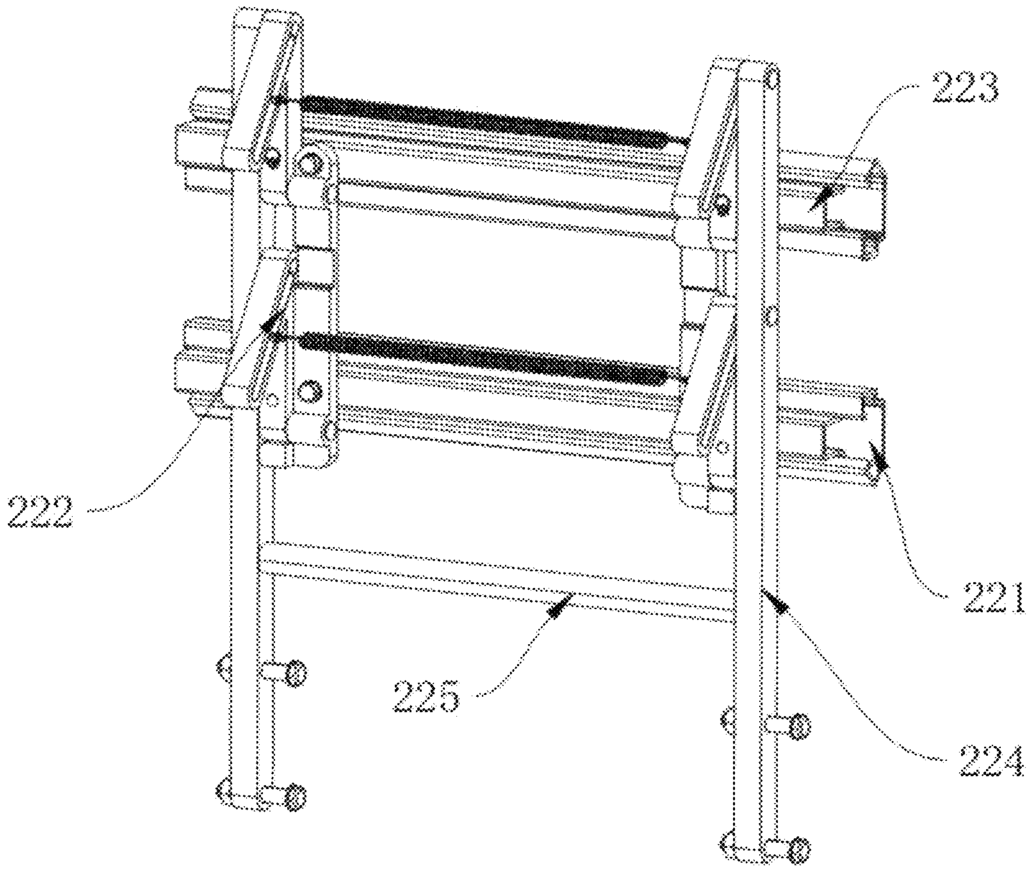
FIG. 8 is a schematic diagram of an outer surface structure of a cover plate moving part of the present disclosure.
Figure 9:
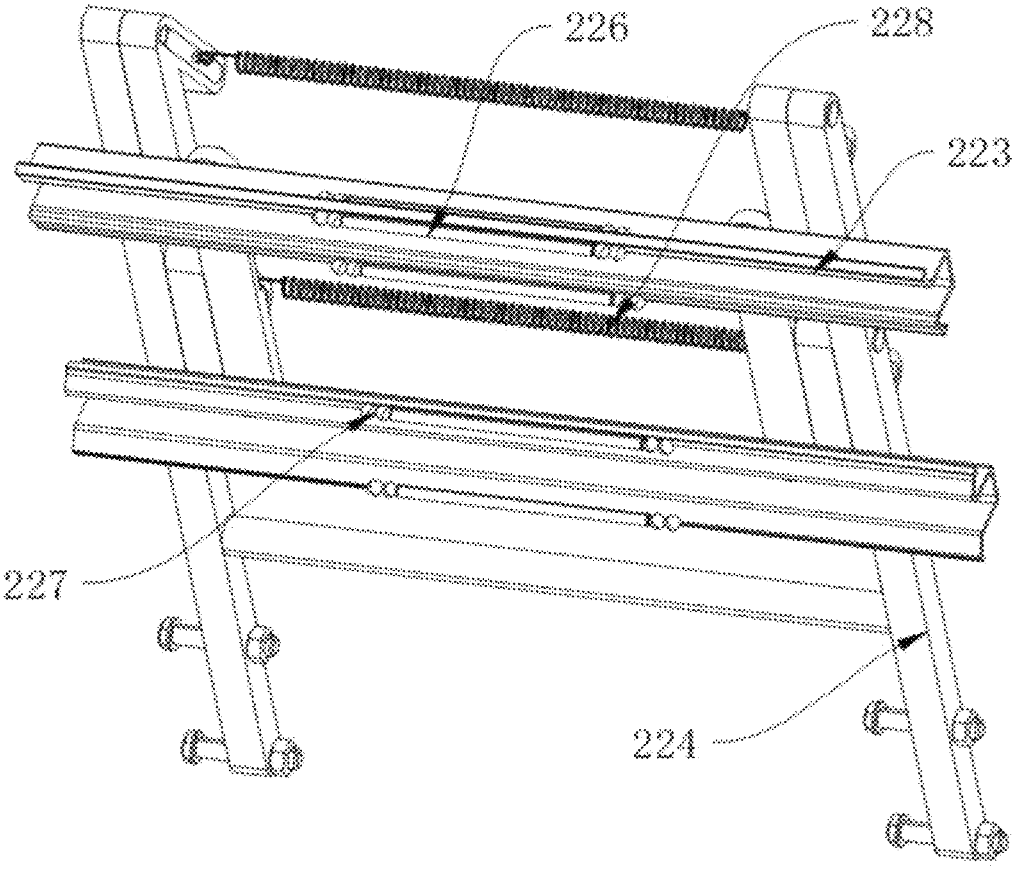
FIG. 9 is a schematic diagram of an inner side structure of a cover plate moving part of the present disclosure.
Figure 10:
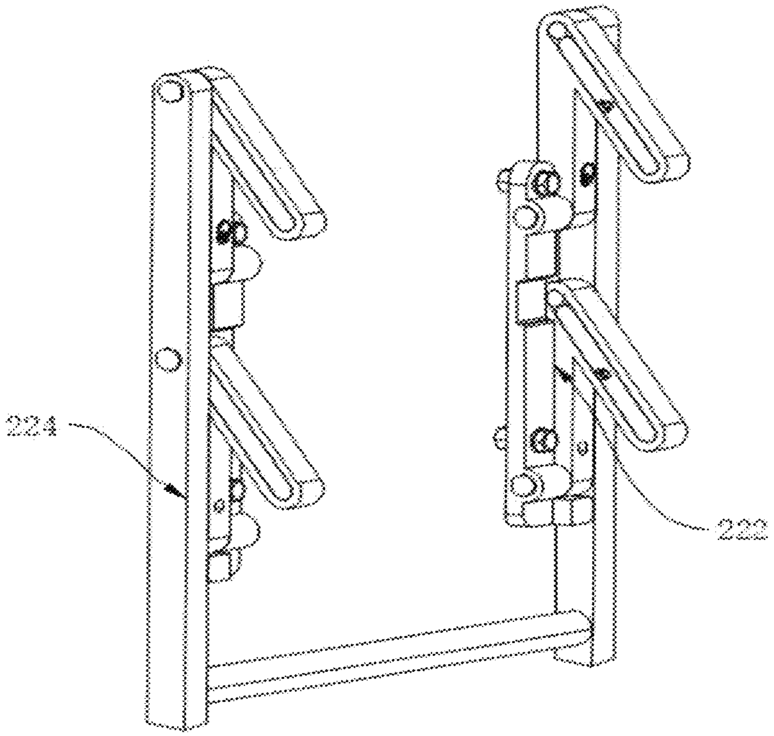
FIG. 10 is a schematic diagram of an outer surface structure of an assembly strip of the present disclosure.
Figure 11:
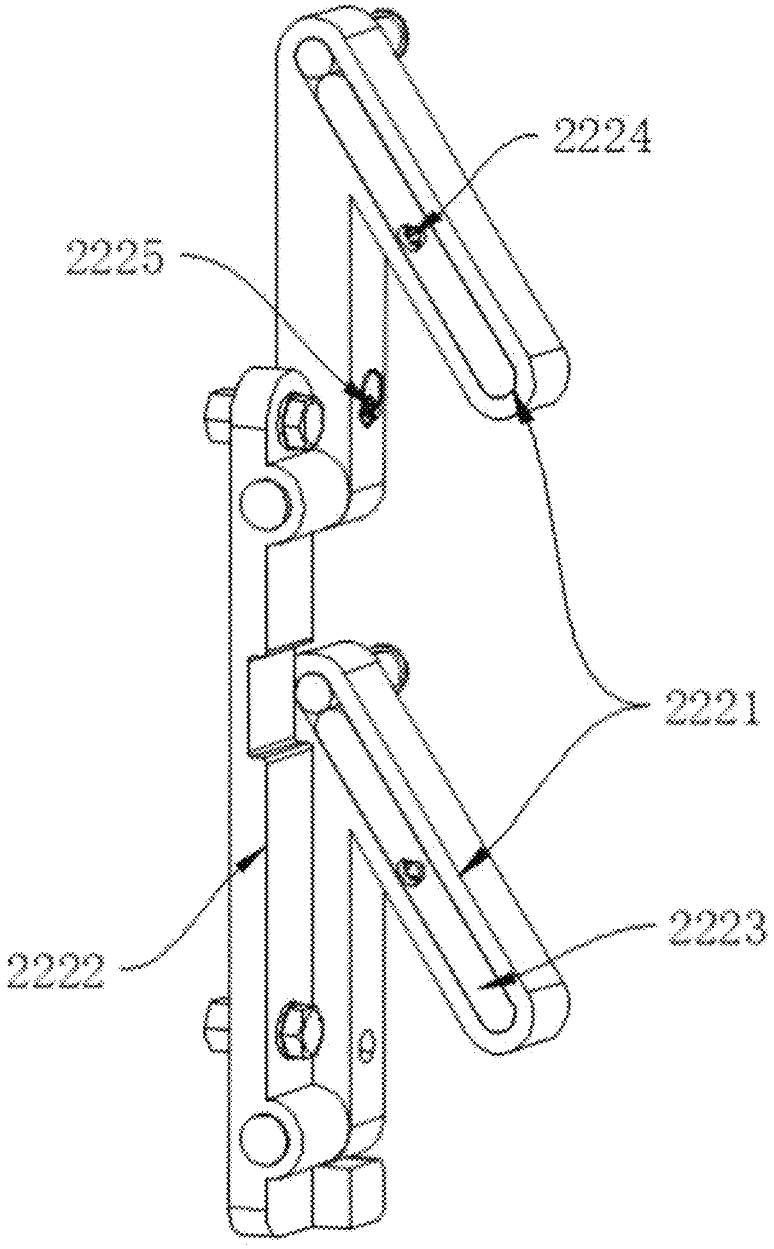
FIG. 11 is a schematic diagram of an outer surface structure of a flip bracket of the present disclosure.

As shown in FIGS. 1 to 11, the low-resistance amphibious vehicle comprises a vehicle body 1, a streamlined front bumper 12 and a streamlined rear bumper 13 are provided on the front side and the rear side of the vehicle body 1 respectively, a wheel 16 is mounted at the bottom of the vehicle body 1, and a retractable suspension mechanism 17 is provided at the bottom of both the front and rear ends of the vehicle body 1;

- the retractable suspension mechanism 17 comprises an assembly bracket plate 171, a quadrilateral cantilever member 172 and a telescopic hydraulic spring 173, the assembly bracket plate 171 is fixedly arranged on the side of the vehicle body 1, and the quadrilateral cantilever member 172 is movably hinged between the wheel 16 and the assembly bracket plate 171, the telescopic hydraulic spring 173 is fixedly mounted inside the vehicle body 1, and the bottom end of the telescopic hydraulic spring 173 is movably hinged with the quadrilateral cantilever member 172;
- the vehicle body 1 comprises a shell 11, a frame 14 and a power assembly 15. The power assembly 15 is fixedly mounted inside the frame 14. The shell 11 is mounted on the outer surface of the frame 14 in a covered manner, and the streamlined front bumper 12 and the streamlined rear bumper 13 are fixedly assembled on the front end and the rear end of the shell 11 respectively.

The assembly bracket plate 171 is fixedly mounted on the frame 14, the inner side of the wheel 16 is rotatably connected to a wheel hub assembly 174, the wheel hub assembly 174 is fixedly mounted on the side of the frame 14, and the power assembly 15 is drivingly connected to the wheel 16.

The quadrilateral cantilever member 172 comprises an upper cantilever 1721, a lower cantilever 1722, and a suspension arm 1723; the ends of the upper cantilever 1721 and the lower cantilever 1722 are both rotatably connected to the outer side wall of the assembly bracket plate 171; one end of the suspension arm 1723 is movably hinged to the upper cantilever 1721, the other end of the upper cantilever 1721 is fixedly mounted to the wheel hub assembly 174, and the end of the lower cantilever 1722 is movably hinged to the bottom end of the suspension arm 1723. The upper cantilever 1721, the lower cantilever 1722, the suspension arm 1723 and the assembly bracket plate 171 form a parallelogram structure, such that the suspension arm 1723 can move vertically up and down without turning over. Meanwhile, when the suspension arm 1723 moves downward, the outer side thereof moves the wheel 16 outwardly, thereby increasing the tread of the wheels on both sides. The increase in the tread is conducive to improving the handling stability and lateral stability of the vehicle, so that the vehicle can resist the roll when turning and is more stable when driving at high speed or making sharp turns. When the suspension arm 1723 moves upward, the wheel 16 is driven to move upward and inward, so that the wheel 16 is retracted to the bottom of the shell 11, thereby reducing the friction resistance with the water body when driving in water.

The bottom end of the telescopic hydraulic spring 173 is fixedly mounted on the suspension arm 1723, the wheel hub assembly 174 is internally rotatably connected to a wheel axle 175, and a ball cage transmission shaft 1724 is mounted between the power assembly 15 and the wheel 16. The telescopic hydraulic spring 173 mainly includes a group of hydraulic rods and shock-absorbing springs sleeved on the outer surfaces of the hydraulic rods. When the vehicle is driving on the road, the shock-absorbing springs are used for driving shock absorption. When the hydraulic rods are contracted, the suspension arm 1723 is driven to move upward, so that the wheel 16 is contracted to the bottom of the shell 11. The ball cage transmission shaft 1724, as a universal transmission component, can realize that the power transmission between the power assembly 15 and the wheel 16 is not affected when raising or lowering the suspension.

The wheel well cover plate 21 is made of a lightweight and high-strength carbon fiber composite material, the surface is streamlined and smoothed, and smoothly transitions with the outer wall of the vehicle body 1, which can effectively reduce water flow resistance and improve navigation speed and efficiency when sailing on water. Furthermore, a flexible sealing strip is provided between the wheel well cover plate 21 and the vehicle body 1, which can prevent water from entering the wheel well when the wheel well cover plate 21 is in a closed state, and ensure the water tightness of the vehicle.

A pair of propellers 4 that rotate relative to each other are provided at the bottom of the vehicle body 1, the propellers 4 are foldable in design and can be folded into a groove at the bottom of the vehicle body 1 to be flush with the outer wall of the bottom of the vehicle body 1 when driving on land, without affecting the normal driving of the vehicle. When sailing on water, the propellers 4 are unfolded and rotated at a high speed to generate a strong propulsion force to push the vehicle to sail at a high speed on the water. The folding and unfolding of the propellers 4 are controlled by an electric mechanism and can be switched freely as needed.

The power switching mechanism 5 comprises a power input shaft 54, two power output shafts 55 and a multi-disc hydraulic clutch 56, the power input shaft 54 is connected to the output shaft of the power assembly 15, the two power output shafts 55 are drivingly connected to the wheel 16 and the propeller 4 respectively, the multi-disc hydraulic clutch 56 is mounted between the power input shaft 54 and the two power output shafts 55. By controlling the engagement state of the multi-disc hydraulic clutch 56, free switching of power between the wheel 16 and the propeller 4 can be achieved and the high efficiency and reliability of power transmission is ensured.

The multi-disc hydraulic clutch 56 comprises a driven disc 561 mounted on the power input shaft 54, two groups of driving discs 562 mounted on the two power output shafts 55 and a hydraulic actuating mechanism 563 for pushing the driving disc 562 and the driven disc 561. The hydraulic actuating mechanism 563 provides hydraulic oil through a vehicle-mounted hydraulic pump, and controls the pressure and flow of the hydraulic oil to accurately control the engagement torque of the driving disc 562 and the driven disc 561, achieve smooth switching of power between the wheel 16 and the propeller 4, avoid the impact and wear during the power switching process, and improve the working efficiency and service life of the power switching mechanism 5. Meanwhile, the multi-disc hydraulic clutch 56 adopts a structure in which multiple pairs of driving discs 562 and driven discs 561 are alternately arranged, which greatly increases the friction contact area, improves the ability to transmit torque, and meets the power requirements of the vehicle under complex working conditions.

A wheel well shielding and resistance reduction mechanism 2 is provided on both sides of the vehicle body 1, and the wheel well shielding and resistance reduction mechanism 2 comprises a cover plate moving part 22 fixedly arranged on the outer wall of the vehicle body 1 and a wheel well cover plate 21 mounted on the cover plate moving part 22.

The cover plate moving part 22 is a manual movable bracket. The manual movable bracket includes a slide rail 221, a flip bracket 222, a sliding connecting piece 223 and an assembly strip 224, the slide rail 221 is fixedly mounted on the side of the shell 11, the sliding connecting piece 223 is slidably connected to the inside of the slide rail 221, the flip bracket 222 is fixedly mounted on the outer surface of the sliding connecting piece 223, the assembly strip 224 is fixedly mounted on the side of the flip bracket 222, and the wheel well cover plate 21 is fixedly mounted on the assembly strip 224.

A sliding rod 226 is fixedly mounted inside the sliding connecting piece 223, and balls 227 are provided at both ends of the sliding rod 226, and the balls 227 are rollingly connected inside the slide rail 221. The balls 227 can effectively reduce the frictional resistance, and the sliding connecting piece 223 can be easily pushed to slide by manpower.

The flip bracket 222 comprises a V-shaped flip connecting arm 2221, a mounting bar 2222, an assembly portion 2223, and a fixed bolt 2225. The mounting bar 2222 is fixedly mounted on the outer surface of the sliding connecting piece 223, one end of the V-shaped flip connecting arm 2221 is rotatably connected to the mounting bar 2222, the middle part of the V-shaped flip connection arm 2221 is rotatably connected to the assembly strip 224, the assembly portion 2223 is fixedly mounted inside the other end of the V-shaped flip connecting arm 2221, the fixed bolt 2225 is movably plugged into the inside of the V-shaped flip connection arm 2221, the fixed bolt 2225 penetrates through the sliding connecting piece 223, and the fixed bolt 2225 is movably plugged into the slide rail 221. Two groups of slide rails 221 are provided, and plug-in fixings adapted to the fixed bolts 2225 are mounted on the two groups of slide rails 221, and the fixed bolts 2225 are provided only in the two groups of upper V-shaped flip connecting arms 2221. When driving on the road, the wheel well cover plates 21 at the front and rear wheels fit the middle outer surface of the shell 11, and the wheels 16 can move normally. At this time, the fixed bolts 2225 are movably plugged with the upper slide rails 221. When the wheel 16 is retracted to the inner bottom of the shell 11 after entering water, the fixed bolt 2225 is pulled outwardly such that the end of the fixed bolt 2225 is moved out from the inner wall of the upper slide rail 221. At this time, the wheel well cover plate 21 and the flip bracket 222 are slid along the slide rail 221 so that the wheel well cover plate 21 slides close to the outer wall of the wheel 16. The wheel well cover plate 21 is pulled outwardly and then pushed downward so that the V-shaped flip connecting arm 2221 rotates on the outer surface of the mounting bar 2222, thereby lowering the wheel well cover plate 21. At the same time, the wheel well cover plate 21 is closer to the wheel 16, and the wheel 16 is wrapped by the inner concave wheel groove 214. Then, the fixed bolt 2225 is pushed inwardly to be plugged into the lower slide rail 221. A hook 2224 is fixedly mounted on the inner side of the assembly portion 2223, a traction spring 228 is mounted between the two groups of hooks 2224, and a connecting column 225 is fixedly mounted between the two groups of assembly strips 224 to prevent the wheel well cover plate 21 from loosening. The wheel well cover plate 21 comprises a streamlined cover plate 211, an outer curved raised handle portion 212, an assembly connecting rod 213 and an inner concave wheel groove 214, the outer curved raised handle portion 212 is integrally formed on the outside of the streamlined cover plate 211, the inner concave wheel groove 214 is formed on the inner side of the outer curved raised handle portion 212, the assembly connecting rod 213 is fixedly welded to the outer surface of the streamlined cover plate 211, and the assembly connecting rod 213 is fixedly mounted on the assembly strip 224 by means of bolts.

The working principle is as follows: firstly, the low-resistance amphibious vehicle is designed with a streamlined front bumper 12 at the front end of the shell 11 and a streamlined rear bumper 13 at the rear end of the shell 11 by simply modifying the shape of the vehicle body. Meanwhile, the entire bottom of the shell is flat, with a pointed front end and a square rear end. The shell 11 part at the wheel hub position adopts a wheel eyebrow streamlined design, which can effectively reduce the viscous resistance of the amphibious vehicle in the underwater part. Furthermore, such a design can reduce the resistance of the amphibious vehicle when gliding in the water, thereby improving the water navigation efficiency;

Secondly, a retractable suspension mechanism 17 is designed for the connecting part between the vehicle body and the wheel 16. When driving on the road, a hydraulic rod inside the telescopic hydraulic spring 173 is extended, such that the telescopic hydraulic spring 173 becomes longer as a whole. At this time, the internal spring is used for driving shock absorption. Meanwhile, as the internal hydraulic rod is extended, the suspension arm 1723 is driven to move downward. At this time, the suspension arm 1723, the upper cantilever 1721, the lower cantilever 1722 and the assembly bracket plate 171 constitute a parallelogram structure, so that the suspension arm 1723 will not twist when descending, and move downward and outward as a whole to cope with the bumps when driving on the road. When the amphibious vehicle enters water, the hydraulic rod inside the telescopic hydraulic spring 173 is contracted, so that the suspension arm 1723 moves upward and inward to drive the wheel 16 to retract to the bottom of the vehicle shell 11, thereby reducing the contact between the wheel 16 components and the water body and reducing the sailing resistance;

Furthermore, the amphibious vehicle is designed with a wheel well shielding and resistance reduction mechanism 2 at the wheel 16. When driving on the road, the wheel well cover plate 21 at the front and rear wheels slides toward the middle part and fits the outer surface of the shell 11. At this time, the wheel 16 can move normally. When the wheel 16 is retracted to the inner bottom of the shell 11 after entering water, the fixed bolt 2225 is pulled outwardly such that the end of the fixed bolt 2225 is moved out from the inner wall of the upper slide rail 221. At this time, the wheel well cover plate 21 and the flip bracket 222 are slid along the slide rail 221 so that the wheel well cover plate 21 slides close to the outer wall of the wheel 16. The wheel well cover plate 21 is pulled outwardly and then pushed downward so that the V-shaped flip connecting arm 21 rotates on the outer surface of the mounting bar 2222, thereby lowering the wheel well cover plate 21. At the same time, the wheel well cover plate 21 is closer to the wheel 16, and the wheel 16 is wrapped by the inner concave wheel groove 214. Then, the fixed bolt 2225 is pushed inwardly to be plugged into the lower slide rail 221, so that the wheel 16 does not directly contact the water flow, thereby reducing the friction resistance of the vehicle body.

In practical applications, the cover plate moving part 22, which is a connecting component between the vehicle body 1 and the wheel well cover plate 21, can be a manual movable bracket described above for flipping use. The cover plate moving part 22 can also be a pneumatic telescopic rod structure. The pneumatic telescopic rod 3 adopts a double-acting cylinder structure, and compressed air is provided by a vehicle-mounted air compressor to achieve telescopic movement, a cylinder body of the pneumatic telescopic rod 3 is hinged to the vehicle body 1, and a piston rod is hinged to the wheel well cover plate 21, and the opening and closing angle and speed of the wheel well cover plate 21 are controlled by controlling the pressure difference on both sides of the inner cavity of the pneumatic telescopic rod 3, to achieve smooth switching of the wheel well cover plate 21 between the driving state and the water navigation state, and improve the amphibious performance and reliability of the vehicles.

The output end of the pneumatic telescopic rod is fixedly mounted with the wheel well cover plate 21, thereby pulling the wheel well cover plate 21 to automatically open and close and slide.

The basic principles, main technical features, and advantages of the present disclosure are described above. It should be understood by those skilled in the art that the present disclosure is not limited to the above embodiments. The above embodiments and specification are only for explaining the principles of the present disclosure. Without departing from the spirit and scope of the present disclosure, various changes and improvements can be made to the present disclosure, and these changes and improvements shall fall within the scope of protection of the present disclosure. The scope of protection of the present disclosure shall be defined by the appended claims and the equivalents thereof.

The invention claimed is:

1. A low-resistance amphibious vehicle, comprising a vehicle body (1), wherein a streamlined front bumper (12) and a streamlined rear bumper (13) are provided on the front side and the rear side of the vehicle body (1) respectively, and a wheel (16) is mounted at the bottom of the vehicle body (1), and a retractable suspension mechanism (17) is provided at the bottom of both the front and rear ends of the vehicle body (1);

the retractable suspension mechanism (17) comprises an assembly bracket plate (171), a quadrilateral cantilever member (172) and a telescopic hydraulic spring (173), the assembly bracket plate (171) is fixedly arranged on the side of the vehicle body (1), and the quadrilateral cantilever member (172) is movably hinged between the wheel (16) and the assembly bracket plate (171), the telescopic hydraulic spring (173) is fixedly mounted inside the vehicle body (1), and the bottom end of the telescopic hydraulic spring (173) is movably hinged with the quadrilateral cantilever member (172);

a wheel well shielding and resistance reduction mechanism (2) is provided on both sides of the vehicle body (1), and the wheel well shielding and resistance reduction mechanism (2) comprises a cover plate moving part (22) fixedly arranged on the outer wall of the vehicle body (1) and a wheel well cover plate (21) mounted on the cover plate moving part (22), the cover plate moving part (22) is a manual movable bracket, and the wheel well cover plate (21) is pushed to open and close by the manual movable bracket.

2. The low-resistance amphibious vehicle according to claim 1, wherein the vehicle body (1) comprises a shell (11), a frame (14) and a power assembly (15), the power assembly (15) is fixedly mounted inside the frame (14), and the shell (11) is mounted on the outer surface of the frame (14) in a covered manner, and the streamlined front bumper (12) and the streamlined rear bumper (13) are fixedly assembled on the front end and the rear end of the shell (11) respectively.

3. The low-resistance amphibious vehicle according to claim 2, wherein the assembly bracket plate (171) is fixedly mounted on the frame (14), the inner side of the wheel (16) is rotatably connected to a wheel hub assembly (174), the wheel hub assembly (174) is fixedly mounted on the side of the frame (14), and the power assembly (15) is drivingly connected to the wheel (16).

4. The low-resistance amphibious vehicle according to claim 3, wherein the quadrilateral cantilever member (172) comprises an upper cantilever (1721), a lower cantilever (1722), and a suspension arm (1723); the ends of the upper cantilever (1721) and the lower cantilever (1722) are both rotatably connected to the outer side wall of the assembly bracket plate (171); one end of the suspension arm (1723) is movably hinged to the upper cantilever (1721), the other end of the upper cantilever (1721) is fixedly mounted to the wheel hub assembly (174), and the end of the lower cantilever (1722) is movably hinged to the bottom end of the suspension arm (1723).

5. The low-resistance amphibious vehicle according to claim 4, wherein the bottom end of the telescopic hydraulic spring (173) is fixedly mounted on the suspension arm (1723), the wheel hub assembly (174) is internally rotatably connected to a wheel axle (175), and a ball cage transmission shaft (1724) is mounted between the power assembly (15) and the wheel (16).

6. The low-resistance amphibious vehicle according to claim 1, wherein the wheel well cover plate (21) is made of a lightweight and high-strength carbon fiber composite material, the surface is streamlined and smoothed, and smoothly transitions with the outer wall of the vehicle body (1), which can effectively reduce water flow resistance and improve navigation speed and efficiency when sailing on water, and a flexible sealing strip is provided between the wheel well cover plate (21) and the vehicle body (1), which can prevent water from entering the wheel well when the wheel well cover plate (21) is in a closed state.

7. The low-resistance amphibious vehicle according to claim 6, wherein the cover moving part (22) is a pneumatic telescopic rod structure, the pneumatic telescopic rod structure adopts a double-acting cylinder structure, and compressed air is provided by a vehicle-mounted air compressor to achieve telescopic movement, a cylinder body of the pneumatic telescopic rod is hinged to the vehicle body (1), and a piston rod is hinged to the wheel well cover plate (21), and the opening and closing angle and speed of the wheel well cover plate (21) are controlled by controlling the pressure difference on both sides of the inner cavity of the pneumatic telescopic rod, to achieve smooth switching of the wheel well cover plate (21) between the driving state and the water navigation state.

8. The low-resistance amphibious vehicle according to claim 1, wherein a pair of propellers that rotate relative to each other are provided at the bottom of the vehicle body (1), the propellers are foldable in design and can be folded into a groove at the bottom of the vehicle body (1) to be flush with the outer wall of the bottom of the vehicle body (1) when driving on land, and when sailing on water, the propellers are unfolded and rotated at a high speed to generate a strong propulsion force to push the vehicle to sail at a high speed on the water, the folding and unfolding of the propellers are controlled by an electric mechanism.

9. The low-resistance amphibious vehicle according to claim 8, wherein the power switching mechanism comprises a power input shaft, two power output shafts and a multi-disc hydraulic clutch, the power input shaft is connected to the output shaft of the power assembly (15), the two power output shafts are drivingly connected to the wheel (16) and the propeller respectively, the multi-disc hydraulic clutch is mounted between the power input shaft and the two power output shafts, by controlling the engagement state of the multi-disc hydraulic clutch, free switching of power between the wheel (16) and the propeller is achieved.

10. The low-resistance amphibious vehicle according to claim 9, wherein the multi-disc hydraulic clutch comprises a driven disc mounted on the power input shaft, two groups of driving discs mounted on the two power output shafts and a hydraulic actuating mechanism for pushing the driving disc and the driven disc, the hydraulic actuating mechanism provides hydraulic oil through a vehicle-mounted hydraulic pump, and controls the pressure and flow of the hydraulic oil to accurately control the engagement torque of the driving disc and the driven disc, achieve smooth switching of power between the wheel (16) and the propeller, and avoid the impact and wear during the power switching process; the multi-disc hydraulic clutch adopts a structure in which multiple pairs of driving discs and driven discs are alternately arranged to increase the friction contact area.

* * * * *